(12) United States Patent
Kojima

(10) Patent No.: US 6,906,311 B2
(45) Date of Patent: Jun. 14, 2005

(54) PHOTOELECTRIC ENCODER

(75) Inventor: Kenji Kojima, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 0 days.

(21) Appl. No.: 10/843,460

(22) Filed: May 12, 2004

(65) Prior Publication Data
US 2005/0006572 A1 Jan. 13, 2005

(30) Foreign Application Priority Data
May 13, 2003 (JP) .......................... 2003-134676

(51) Int. Cl.⁷ .............................. G01D 5/34
(52) U.S. Cl. ...................... 250/231.16; 250/237 G
(58) Field of Search .............. 250/231.16, 231.13, 250/231.14, 231.15, 231.17, 231.18, 237 G, 214.1, 208.1; 341/11, 13, 31; 356/614, 616, 617

(56) References Cited

U.S. PATENT DOCUMENTS

| 3,937,964 A | * | 2/1976 | Muehllehner ............... 250/366 |
| 4,471,387 A | * | 9/1984 | Nadler .................... 250/208.1 |
| 5,956,087 A | * | 9/1999 | Takayama et al. .......... 348/275 |
| 2004/0149919 A1 | * | 8/2004 | Lechner et al. ........ 250/370.01 |

FOREIGN PATENT DOCUMENTS

| JP | A 7-151565 | 6/1995 |
| WO | WO 01/31292 A1 | 5/2001 |

* cited by examiner

Primary Examiner—Thanh X. Luu
Assistant Examiner—Seung C. Sohn
(74) Attorney, Agent, or Firm—Oliff & Berridge, PLC

(57) ABSTRACT

A photoelectric encoder includes an optical receipt chip on which the light acceptance surfaces of a plurality of photodiodes are disposed two-dimensionally. Four optical signals different in phase from one another (i.e., light signals with phase "A," phase "B," phase "AA," and phase "BB") are guided to fall onto the light acceptance surfaces. The shape of each light acceptance surface is a regular hexagon.

4 Claims, 8 Drawing Sheets

PHOTOELECTRIC ENCODER

CROSS-REFERENCE TO PRIOR APPLICATION(S)

This application is based upon and claims the benefit of priority from the prior Japanese Patent Application No. 2003-134676, filed on May 13, 2003, the entire contents of which are incorporated herein by reference.

BACKGROUND OF THE INVENTION

1. Field of the Invention

The present invention relates to photoelectric encoders used for precise measurement.

2. Description of Related Art

In prior known applications, photoelectric encoders (referred to as "encoder" in some cases) are utilized for high-precision measurement of linear and angular displacement amounts. Encoders are equipped in three-dimensional (3D) measuring equipment, image measuring apparatus and others. An encoder is generally constituted from a light source, a scale including an optical grating, and a light-receiving unit which is disposed to be relatively movable together with the light source with respect the scale. The light-receiving unit, also known as photosensor module, includes four light-receiving elements (for example, photodiodes) and four index gratings which are laid out at locations corresponding to the light acceptance surfaces of respective light-receiving elements and which are different in phase from one another.

An operation of the encoder will be briefly explained below. While causing the light source and the light-receiving unit to relatively move together with respect to the scale, light from the light source is guided to progress through an optical system including the optical grating of the scale and then fall onto the four index gratings of the light-receiving unit. More specifically, while letting the index gratings of the light-receiving unit move relative to the optical grating of the scale, a pattern of interference fringes (light-and-shade pattern) that is created by irradiation of the light from the light source onto the optical grating of the scale is guided to hit the index gratings of the light-receiving unit. This results in production of four separate optical signals each having a sinusoidal or "sine" waveform indicative of a change in light intensity. These optical signals are different in phase from one another. The light signals are to be received and sensed by light-receiving elements corresponding to respective phases to thereby produce photoelectrically converted electrical signals, which are used for measurement of a position change amount, such as a linear displacement.

The four phase-different optical signals of interest are an optical signal with a phase "A" (zero degrees), an optical signal with a phase "B" (90 degrees) which is deviated or offset by 90 degrees from the phase A, an optical signal with a phase "AA" (180 degrees) that is offset by 180 degrees from the phase A, and an optical signal with a phase "BB" (270 degrees) as offset by 270 degrees from the phase A. Using the phase A and phase B is to determine or "judge" the direction of relative movement of the light-receiving unit in a way depending upon which one of the phases A and B is to be detected first. Additionally, the use of those light signals with the phases AA and BB—these are phase-inverted versions of the light signals with phases A and B, respectively—in addition to the light signals with phases A and B is aimed at (1) removal of DC components contained in the light signals with phases A and B, (2) achievement of the reliability of light signals, and (3) establishment of high-speed tracking capabilities.

Principally, measurement is achievable as far as there are light-receiving elements which correspond in number to a plurality of phase-different optical signals. Accordingly, in the case of four phase-different light signals, what is required is to use four light-receiving elements. An encoder of the first type is disclosed, for example, in the pamphlet of International Publication No. 01/31292 (see the specification, page 5, line 19 to page 6, line 7, along with FIG. 5).

Incidentally, deviation or fluctuation sometimes takes place in light amount due to the light source's optical intensity distribution and/or dirt on the surface of a scale. According to the above-noted type of encoder, this is easily affectable by such light amount irregularity, because an optical signal with each phase is sensed at a single location. For example, suppose that the layout position of a light-receiving element used for the phase A is weaker in intensity of irradiation light than the layout position of another light-receiving element. If this is the case, an output of the phase A becomes weaker, resulting in a likewise decrease in measurement accuracy.

A known approach to avoiding this is to employ a second type of encoder, which has an array of fine-divided light-receiving elements. More specifically, these fine-divided light-receiving elements are placed to have an array-like layout to thereby make them function also as index gratings. Furthermore, the light-receiving elements are disposed along the encoder's measurement axis direction while being organized into a plurality of sets, each of which consists of four light-receiving elements used for the phases A, B, AA and BB. This type is disclosed, for example, in Published Japanese Patent Application No. 7-151565 (JP-A-7-151565). Paragraph "[0014]" and FIG. 4. With this approach, the location whereat an optical signal with each phase is sensed is dispersed to cover a wide range. Thus it is possible to lessen the influenceability of light-amount irregularity. This will be referred to as the "averaging effect" hereinafter. Moreover, a third type of encoder is also available. This encoder is aimed at further enhancement of the averaging effect. To do this, the encoder is arranged so that multiple sets of light-receiving elements are laid out along a "y" direction in addition to the measurement axis direction ("x" direction). This type is disclosed, for example, in the pamphlet of International Publication No. 01/31292 (see the specification, page 21, line 6 to page 22, line 23, and also FIG. 16).

BRIEF SUMMARY OF THE INVENTION

Enhancing the averaging effect is important to improve the measurement accuracy. Unfortunately, mere enhancement of the averaging effect would result in a decrease in response speed of the encoder. This will be explained in detail below.

Light-receiving elements such as photodiodes are typically structured to have a p-n junction with an n-type semiconductor layer being in contact with a p-type semiconductor layer. If the capacitance of this junction becomes larger, then the encoder decreases in response speed. Thus, an increase in junction capacitance affects the performance of encoder. The junction capacitance of a light-receiving element is in correlation with the area of a light acceptance surface and/or the length of circumference (edges) of the light acceptance surface. In short, an increase in area or circumferential length results in a likewise increase in junction capacitance; a decrease in area or circumferential length results in a decrease in junction capacitance.

In the second and third types stated above, the light-receiving elements for use therein become greater in number than those of the first type even when a total sue of the areas of light acceptance surfaces is the same as that of the first type. Thus, a total of circumferential lengths becomes larger in value. Accordingly, the second and third types become greater in junction capacitance than the first type, resulting in a decrease in encoder response speed. It is thus apparent that with the prior art techniques, whenever an attempt is made to simply enhance the averaging effect, the light-receiving elements increase in junction capacitance; adversely, when lowering the junction capacitance of light-receiving elements, the average effect becomes less.

When the optical grating of a scale is designed to become narrower in pitch in order to enable more precise measurement, it is inevitably required to narrow the pitch of light-receiving elements also in a way corresponding thereto. This requires layout of a great number of light-receiving elements each having a lessened width of light acceptance surface. In order to obtain by photoelectric conversion an electrical signal with its magnitude necessary for measurement, it is required that a total of the areas of light acceptance surfaces stays at a prespecified level or higher. Accordingly, when making the light-receiving elements narrower in pitch, the number of light-receiving elements increases resulting in an increase in total of circumferential lengths of light acceptance surfaces, which leads to an increase in total sum of junction capacitance values of multiple light-receiving elements. Hence, when causing the optical grating of the scale to become narrower in pitch, it is no longer possible to ignore the problem as to a decrease in encoder response speed.

The present invention was made in view of the problems stated above, and its object is to provide a photoelectric encoder capable of attaining the conflicting or "trade-off" requirements: enhancing the averaging effect, and lessening the junction capacitance of light-receiving elements.

In accordance with one aspect of this invention, a photoelectric encoder is provided which comprises a light source, a scale including a first optical grating for receiving irradiation of light from the light source, and a light-receiving unit including light-receiving elements each having a light acceptance surface for permitting incidence of an optical signal as generated based on the light falling onto the first optical grating. The light acceptance surface is hexagonal in shape. The light-receiving unit is relatively movably disposed with a gap provided between itself and the scale. This unit is operable to detect a plurality of phase-different optical signals by the light-receiving elements, which are two-dimensionally disposed on a plane opposing the first optical grating.

According to the photoelectric encoder of the invention, the individual light-receiving elements are specifically arranged so that its light acceptance surface resembles a hexagon in planar shape. Thus it is possible to increase the number of light acceptance surfaces which are disposable side by side around a light acceptance surface, when compared to mere rectangle acceptance surfaces. With such an arrangement, it is possible to enhance the averaging effect, which makes it possible to achieve high-precision measurement with increased accuracy. Alternatively, in the case where the light acceptance surface stays the same in area, it is possible to lessen the junction capacitance of light-receiving elements. This can be said because hexagonally shaped light acceptance surfaces are less in length of circumference (edges) than rectangular ones. As a result, it becomes possible to increase the response speed of the photoelectric encoder.

In the photoelectric encoder in accordance with the invention, it is possible for a plurality of light-receiving elements to cause optical signals being detected by adjacent ones thereof to differ in phase from each other. This makes it possible to disperse certain light-receiving elements for detection of optical signals with the same phase. Adversely saying, it is possible to allow light-receiving elements for detection of phase-different signals to come closer to each other. Accordingly, even in the presence of deviation or irregularity in intensity of light signals, this influence is averaged and applied to the light-receiving elements for receipt of phase-different signals. Thus it is possible to reduce measurement errors occurring due to a deviation in optical signal intensity between phases.

In the encoder in accordance with the invention, the plurality of light-receiving elements may be integrated together an optical receipt chip, also called photosensor chip, including second optical gratings formed in the chip. Each of these gratings has light shielding portions that are disposed to overlie each of the light acceptance surfaces. With this feature, even when enlarging the area of light acceptance surface in order to reduce the junction capacitance of light-receiving elements, high-precision measurement is enabled because of the layout of the second optical grating.

In the encoder in accordance with the invention, the photosensor chip may be arranged to include more than one contact portion which underlies the light shield portion with electrical conductivity and which is connected thereto while being in contact with a light acceptance surface associated therewith, and one or more electrical wiring lines connected to the light shield portion. With this feature, the light shield portion of the second optical grating functions also as a wiring line to be connected to a light-receiving element. Thus it is possible to preclude reduction of the effective light absorbent area of a light acceptance surface.

DETAILED DESCRIPTION OF THE INVENTION

Figure 1:
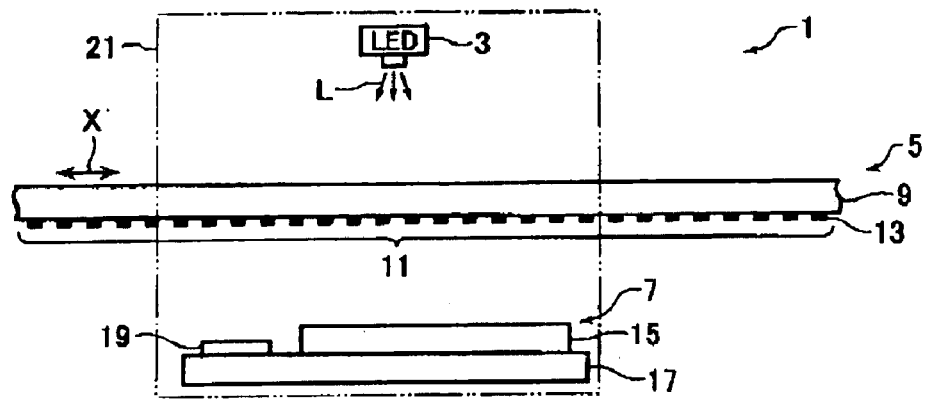
FIG. 1 is a diagram showing a schematic configuration of a photoelectric encoder in accordance with a first embodiment of this invention.

First to third embodiments of a photoelectric encoder in accordance with this invention will be explained with reference to the accompanying drawings below. Note here that in the drawings for explanation of the second and third embodiments, parts or components denoted by the same reference characters as those of their preceding embodiment are added the same reference characters, with explanations thereof omitted.

[First Embodiment]

FIG. 1 is a diagram schematically showing a configuration of a photoelectric encoder 1 in accordance with the first embodiment. Although a main feature of this embodiment lies in the structure of an optical receipt chip that is included in a light-receiving unit, an explanation will first be given of the photoelectric encoder 1 per se for purposes of facilitation of the understanding of this feature. First, an arrangement of the photoelectric encoder 1 will be set forth. This encoder 1 is generally structured from a light-emitting diode (LED) 3, a scale 5 and a light-receiving unit 7. The scale 5 and light-receiving unit 7 are disposed in an order of sequence closer to the LED 3.

The LED 3 is one example of a light source. Light L from LED 3 falls onto the scale 5. Scale 5 includes a transparent substrate 9, which is made of an optically transparent material, such as glass or the like. Its part is depicted in FIG. 1. A first optical grating 11 is formed on a surface of transparent substrate 9, which is on the opposite side to the other substrate surface facing the LED 3 side. First optical grating 11 includes a plurality of light shielding portions 13, which are linearly disposed with a prespecified interval or "pitch" defined between adjacent ones thereof. Each light shield portion 13 extends in a direction perpendicular to the drawing sheet. Light shied 13 is made of a chosen metal (for example, chromium) or else.

The light-receiving unit 7 is disposed with a gap provided between itself and the scale 5. Light-receiving unit 7 includes an optical receipt chip—say, photosensor chip—15 which is positioned on the scale 5 side and also includes a printed circuit board 17 on which this chip is mounted. A plurality of photodiodes (sometimes referred to as "PDs" hereinafter) are formed within the photosensor chip 15, although not specifically illustrated herein. A respective one of these PDs has a light acceptance surface with photosensitivity, which faces the first optical grating 11 side. PD is one example of a light-receiving element. In place of the PD, a photo-transistor may be used as the light-receiving element. An integrated circuit (IC) chip 19 for the arithmetic processing use is mounted on the circuit board 17. This IC chip 19 is operable to execute arithmetical processing of a position change amount based on optical signals as detected by a plurality of PDs of the photosensor chip 15.

The light-receiving unit 7 is attached to a holder 21 together with the LED 3. The holder 21 is designed so that it is movable and slidable along the elongate direction of the scale 5, indicated by "X" in FIG. 1. More specifically, the illustrative photoelectric encoder 1 measures a displacement amount while letting the holder 21 move with respect to the scale 5 that is immovably secured. Hence, the X direction becomes a measurement axis (this X direction will be referred to hereinafter as "measurement axis X"). Note here that the present invention is also applicable to another type of device which measures a displacement amount by causing the scale 5 to move while fixing LED 3 and light-receiving unit 7. Accordingly, the light-receiving unit 7 including the photosensor chip 15 is laid out so that this is relatively movable together with LED 3 with respect to scale 5 in the direction of measurement axis X.

A measurement operation of the photoelectric encoder 1 will be explained in brief below. When light L is given off from the LED 3 and then falls onto the first optical grating 11 of the scale 5, a light-and-shade pattern takes place on the photosensor chip 15 due to the presence of first optical grating 11. This light-and-shade pattern is irradiated onto the photosensor chip 15. In this state, the holder 21 is driven to move along the measurement axis X direction so that each photodiode (PD) formed on photosensor chip 15 detects a change of the light/shade pattern thus created (i.e. an optical signal with a sinusoidal or "sine" waveform). More precisely, four phase-different optical signals are respectively sensed by their corresponding PDs—namely, an optical signal with phase "A" (zero degrees), an optical signal with phase "B" (90 degrees) that is shifted or offset in phase by 90 degrees from the phase A, a light signal with phase "AA" (180 degrees) that is phase-shifted by 180 degrees from the phase A, and a light signal with phase "BB" (270 degrees) as phase-shifted by 270 degrees from the phase A. In this way, each PD receives a certain one of multiple phase-different light signals which has its unique phase assigned thereto.

An electrical signal produced by receipt of each optical signal is sent forth toward the IC chip 19. IC chip 19 performs specified processing (including removal of DC components) with respect to the phases A and B; thereafter, a displacement amount is arithmetically determined based on the phases A and B thus processed. This result is output to a display unit, not shown. The above is the operation of the photoelectric encoder 1.

Now then, a principal feature of the first embodiment lies in the photosensor chip 15, which will be explained in detail.

An explanation will first be given of a planar structure of photosensor chip 15. See FIG. 2, which is a pictorially represented plan view of part of photosensor chip 15 when looking at from the first optical grating 11 side of FIG. 1. The light acceptance surfaces of a plurality of photodiodes 23 are two-dimensionally laid out on an "xy" plane that opposes the first optical grating. Note that an "x" axis is identical in direction to the measurement axis X explained in FIG. 1.

Figure 2:
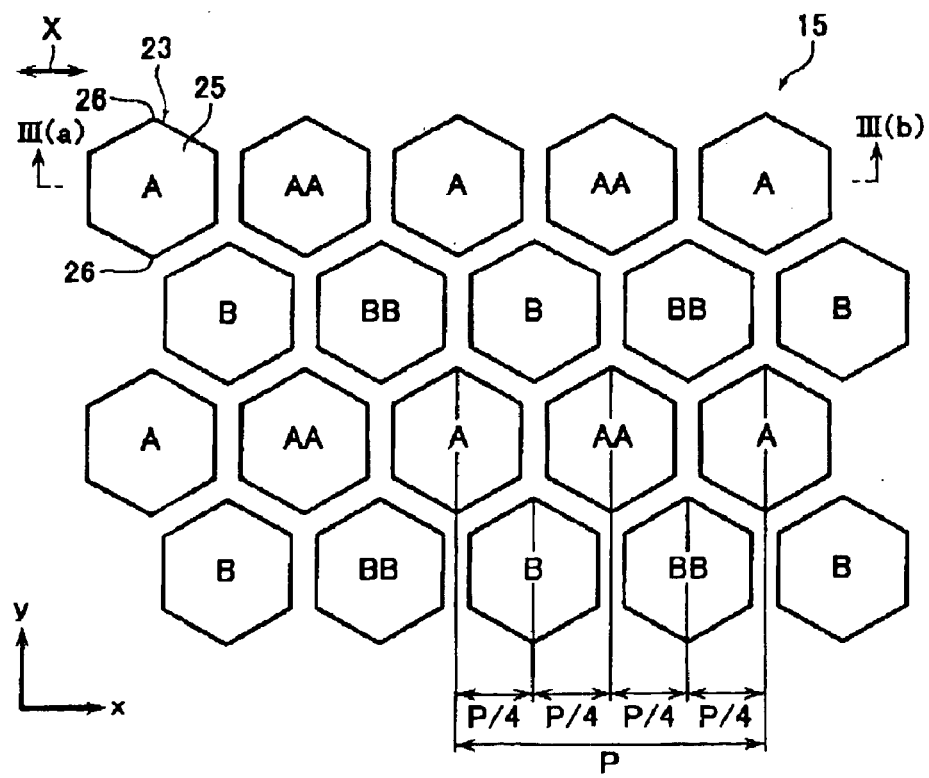
FIG. 2 is a diagram pictorially representing a plan view of part of an optical receipt chip when looking at from the first optical grating side in FIG. 1.

The individual light acceptance surface 25 resembles in shape a regular hexagon with six equal sides. An optical signal, which is generated based on the light falling onto the first optical grating 11, is guided to enter the light acceptance surface 25. In other words, while the above-noted light-and-shade pattern is being radiated onto the photosensor chip 15, a certain one of multiple phase-different light signals which is produced during movement of the holder 21 and which has a certain phase assigned thereto falls onto each light acceptance surface 25. In FIG. 2, those light acceptance surfaces 25, onto which the light signals with the phases A, B, AA and BB fall, are denoted by the reference characters "A," "B," "AA," and "BB," respectively. This is to indicate which one of the light signals with different phases falls onto which one of the light acceptance surfaces. Obviously, there are no such indications on the practically implemented light acceptance surfaces 25.

A two-dimensional (2D) layout of the light acceptance surfaces 25 will be discussed below. The direction of a line segment coupling together a couple of mutually opposing corner points or "apexes" 26 of acceptance surfaces 25 is identical to a "y" direction (that is, the direction at right angles to the measurement axis). Each side of a light acceptance surface 25 opposes a one side edge of six other acceptance surfaces 25 disposed therearound. Hence, six acceptance surfaces 25 are formed around a single acceptance surface 25. Accordingly, the acceptance surfaces 25 are to be laid out to have a beehive-shape pattern. And, a row in which those light acceptance surfaces 25 used for the phase A and acceptance surfaces 25 for the phase AA use are alternately placed in the x direction and a row in which acceptance surfaces 25 used for the phase B and acceptance surfaces 25 for the phase BB use are alternately put in the x direction are alternately disposed in the y direction.

The light acceptance surfaces 25 used for each phase are equal in pitch P to one another. Within one pitch P of light acceptance surfaces 25 for certain phase use, light acceptance surfaces 25 used for the remaining three phases are present. The pitch P of acceptance surfaces 25 used for each phase is disposed with every offset of (¼)P. With these settings, it is possible to detect an optical signal generated by the first optical grating with a phase difference of one-fourth (¼) of the wavelength of this signal.

Figure 3:
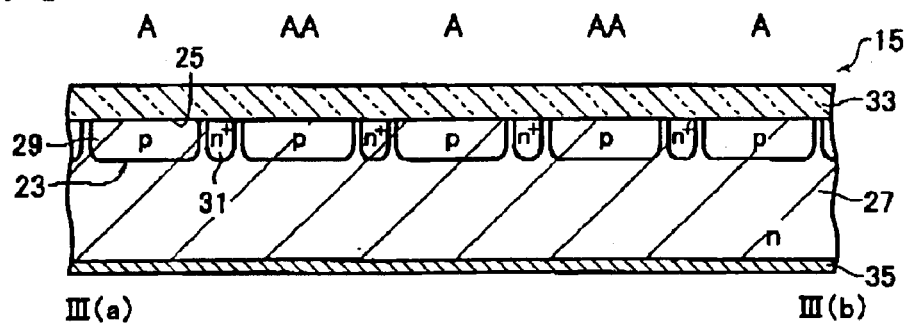
FIG. 3 is a pictorial representation of a cross-section of the optical receipt chip of FIG. 2 as taken along line III(a)–III(b).

Next, a cross-sectional structure of the photosensor chip 15 will be explained below. FIG. 3 is a pictorial representation of a cross-section of photosensor chip 15, which is taken along line III(a)–III(b) of FIG. 2. The photosensor chip 15 has a semiconductor substrate 27 of the n type conductivity. This substrate 27 has one surface in which p-type diffusion regions 29 are formed with an interval provided between adjacent ones thereof. A junction of the semiconductor substrate 27 and a diffusion region 29 becomes a photodiode 23, The one surface of semiconductor substrate 27 includes a region in which a p-type diffusion region 29 is formed and which becomes a light acceptance surface 25. At a surface portion of semiconductor substrate 27 residing between neighboring diffusions 29, a heavily-doped n ($n^+$) type diffusion region 31 is formed. Whereby, the p-type diffusion 29 is electrically separated or isolated from its neighboring diffusion 29—that is, respective PDs 23 are subjected to element isolation.

The one surface of the semiconductor substrate 27 is covered or coated with a protective film 33, such as a silicon oxide film or silicon nitride film, thereby to cover its underlying diffusions 29 and 31. A common electrode 35 of each PD 23 (for example, Au electrode) is entirely formed on the other substrate surface.

An explanation will next be given of the effects and advantages of the photoelectric encoder 1 in accordance with the first embodiment.

Figure 4:
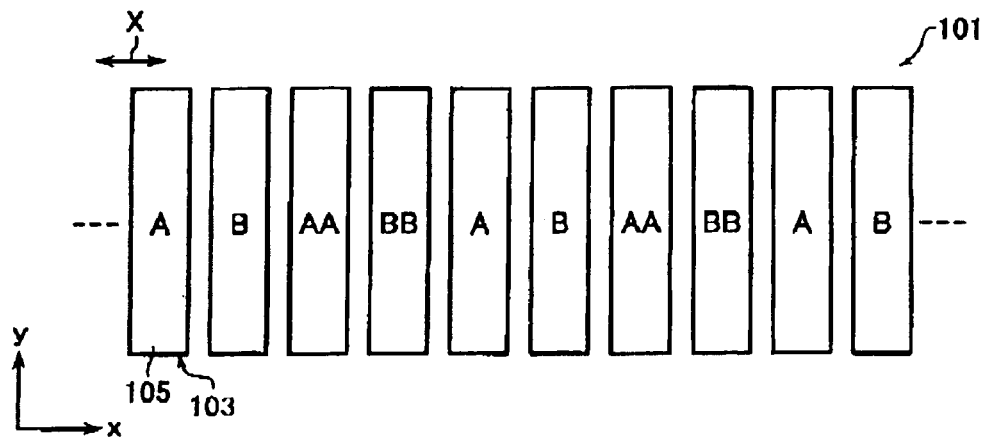
FIG. 4 is a diagram pictorially representing a plan view of part of an optical receipt chip equipped in a photoelectric encoder for use as a comparative example.

(1) According to the first embodiment, it is possible to reduce the junction capacitance of photodiodes. This will be explained in contradistinction to some examples for comparison purposes. FIG. 4 is a pictorially illustrated plan view of part of a photosensor chip 101 equipped in a photoelectric encoder in accordance with a comparative example, which corresponds to FIG. 2. The photosensor chip 101 has a plurality of photodiodes (PDs) 103 disposed along the x direction. Each PD 103 has its light acceptance surface 105, the shape of which is a rectangle with its long sides extending in the y direction.

Figure 5:
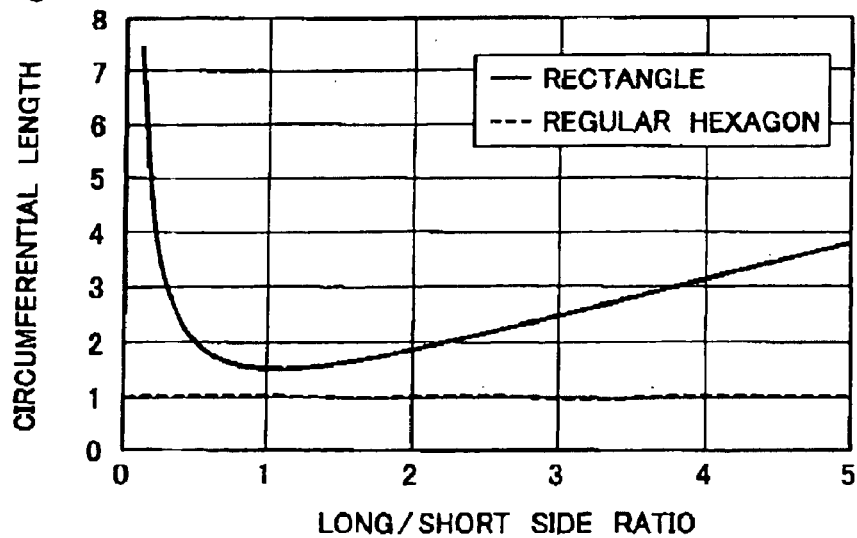
FIG. 5 is a graph showing the length of a circumference (edges) of a rectangle having the same area as that of a regular hexagon.

FIG. 5 is a graph showing a plot of the length of a circumference (edges) of a rectangle having the same area as that of a regular hexagon. The abscissa axis indicates the ratio of a long side to short side of the rectangle, whereas the vertical axis denotes the length of a circumference of the rectangle. The circumferential length of regular hexagon is regarded as "1." As apparent from FIG. 5, if the area is the same then the rectangle becomes greater in circumferential length than the regular hexagon.

Consequently, according to the first embodiment shown in FIG. 2, even in cases where a total value of the areas of multiple light acceptance surfaces 25 is the same as a total of acceptance surfaces 105 shown in FIG. 4, it is possible to lessen a total of circumferential lengths. Thus it is possible to reduce the junction capacitance of photodiodes 23. This makes it possible to increase the response speed of the photoelectric encoder.

(2) As shown in FIG. 2, according to the first embodiment, the shape of light acceptance surface 25 is hexagonal. Thus it is possible to set the number of adjacently disposable acceptance surfaces 25 at six. Accordingly, when compared to the case of the rectangular shape of light acceptance surface 105 shown in FIG. 4, it is possible to increase the number of closely disposable light acceptance surfaces. This makes it possible to enhance the averaging effect. Thus it is possible to realize the measurability with high precision.

(3) As shown in FIG. 2, according to the first embodiment, a PD 23 is different from six other PDs 23 disposed therearound in phase of optical signal to be detected (in other words, the phase of a light signal falling onto each light acceptance surface 25 differs from the phase of any one of light signals hitting the six other acceptance surfaces 25 of the PDs that are located around it). Due to this, PDs 23 are such that light signals to be detected by neighboring ones are different in phase from each other. Thus it is possible to disperse those PDs 23 for detection of light signals with the same phase. Adversely saying, it is possible to allow the PDs 23 for detection of phase-different signals to come closer in position to each other. Accordingly, even in the presence of irregularity in intensity of optical signals, this influence is applied through averaging to the PDs 23 for detection of phase-different signals. Thus it is possible to reduce or minimize measurement errors occurring due to deviation in intensity of light signals between phases.

Figure 6:
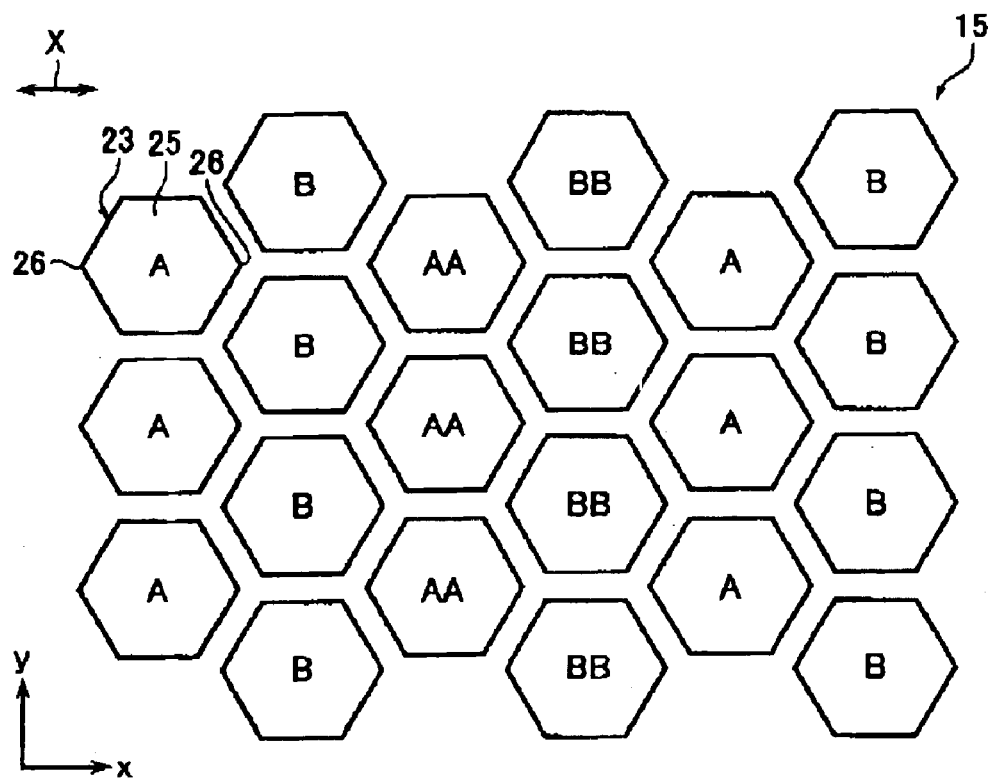
FIG. 6 is a plan view diagram pictorially representing part of one modified example of the optical receipt chip of the first embodiment.

It should be noted that although in the first embodiment the PDs 23 are arranged so that neighboring ones differ in phase of optical signals to be detected thereby, it is permissible that neighboring ones of the PDs 23 are the same as each other in phase of optical signals being sensed by them. FIG. 6 is a diagram pictorially representing a plan view of part of a photosensor chip 15 employable in this case, wherein this view corresponds to FIG. 2. Unlike FIG. 2, FIG. 6 is such that a line segment coupling together a pair of mutually facing apexes 26 of light acceptance surfaces 25 is identical to the x direction. And, several rows each having a queue of light acceptance surfaces 25 used for the phase A, B, AA or BB in the y direction are sequentially laid out in the x direction. In other words, those light acceptance surfaces 25 for incidence of optical signals with the same phase are disposed in the y direction, while certain acceptance surfaces 25 for incidence of phase-different light signals are periodically laid out in the direction of measurement axis X. In this case, the amount of light received becomes greater than that of FIG. 2, although the pitch P is made wider than that of FIG. 2.

Figure 7:
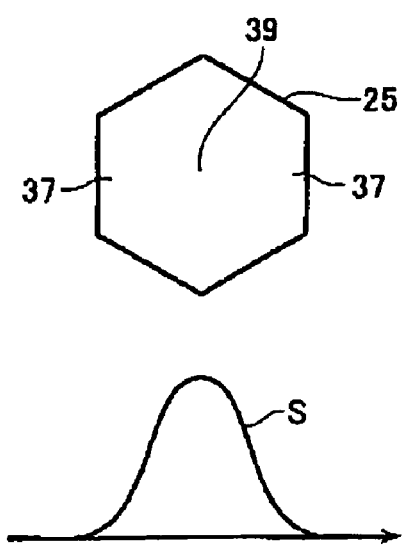
FIG. 7 is a graph showing a relationship of a light acceptance surface of the first embodiment versus the magnitude of an electrical signal generated through photoelectric conversion of an optical signal detected by this surface.

(4) FIG. 7 is a graph showing the relationship of a light acceptance surface 25 versus the magnitude of an electrical signal S which is generated by photoelectric conversion of an optical signal detected by this surface. According to the first embodiment, the acceptance surface 25 is such that a central portion 39 is greater than both side portions 37 in length along the y direction. Thus it is possible to heighten the contrast of such electrical signal S.

(5) In the first embodiment, since the shape of light acceptance surface 25 is hexagonal, in case a plurality of PDs 23 are laid out two-dimensionally as shown in FIG. 2, it is possible to lay and pack an increased number of PDs 23 in a limited area without making any extra spaces of no use. This enables miniaturization or down-sizing of the photosensor chip 15.

[Second Embodiment]

Figure 8:
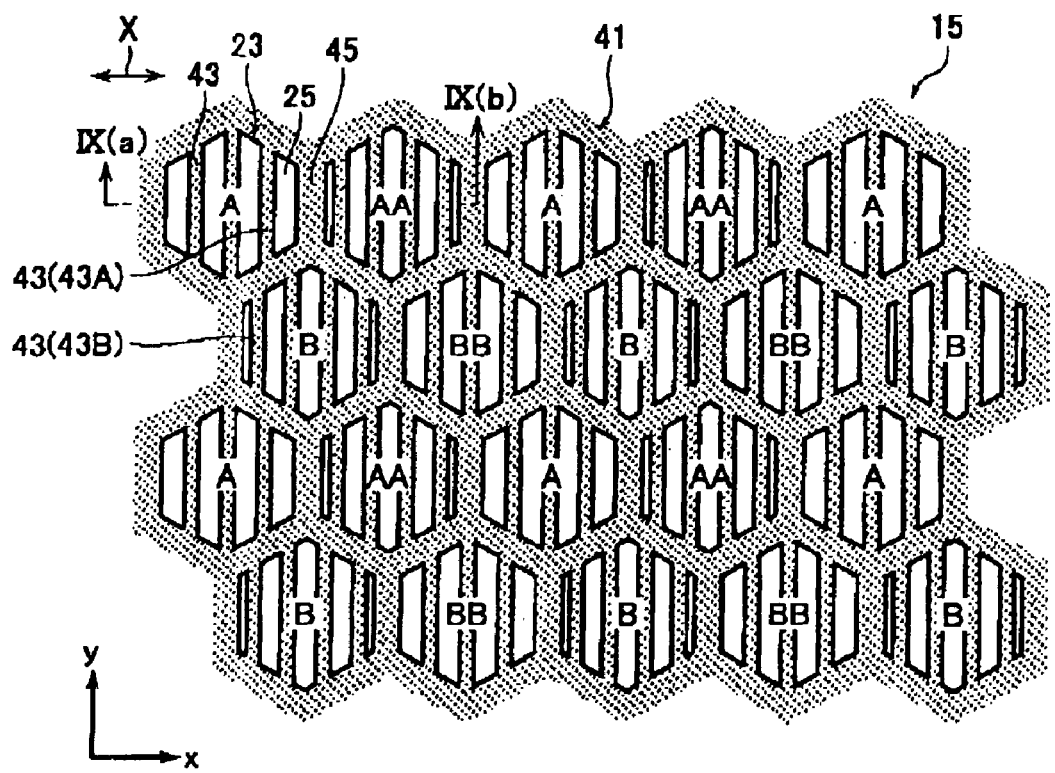
FIG. 8 is a diagram pictorially representing a plan view of part of an optical receipt chip equipped in a photoelectric encoder of a second embodiment.

An explanation of a second embodiment of will be given while focusing it on differences from the first embodiment stated supra. FIG. 8 is a diagram pictorially representing a plan view of part of a photosensor chip 15 used in a photoelectric encoder of the second embodiment. The second embodiment is arranged so that the photosensor chip 15 comes with a second optical grating 41 which is formed to cover each light acceptance surface 25 in the 2D layout shown in FIG. 2.

The second optical grating 41 has a plurality of light shield portions 43, which are disposed at intervals to overlie light acceptance surfaces 25. Each light shield portion 43 has a bar- or rod-like shape with its elongate direction being identical to the y direction. Four or three light shield portions 43 are disposed per light acceptance surface 25. Light shields 43 are laid out with offsets to ensure that optical signals of the same phase hardly fall onto those acceptance surfaces 25 used for different phases (for example, a light shield 43A of a light acceptance surface 25 for the phase A use, and a light shield 43B of an acceptance surface 25 for the phase B use). Light shields 43 may have the nature of blocking transmission of any light rays so that examples of its material are metals (e.g., chromium or aluminum) and resins or plastics. A light shield portion 45 is formed in a marginal space between neighboring acceptance surfaces 25. The light shield 45 and light shields 43 are fabricated by patterning techniques at the same process step.

Figure 9:
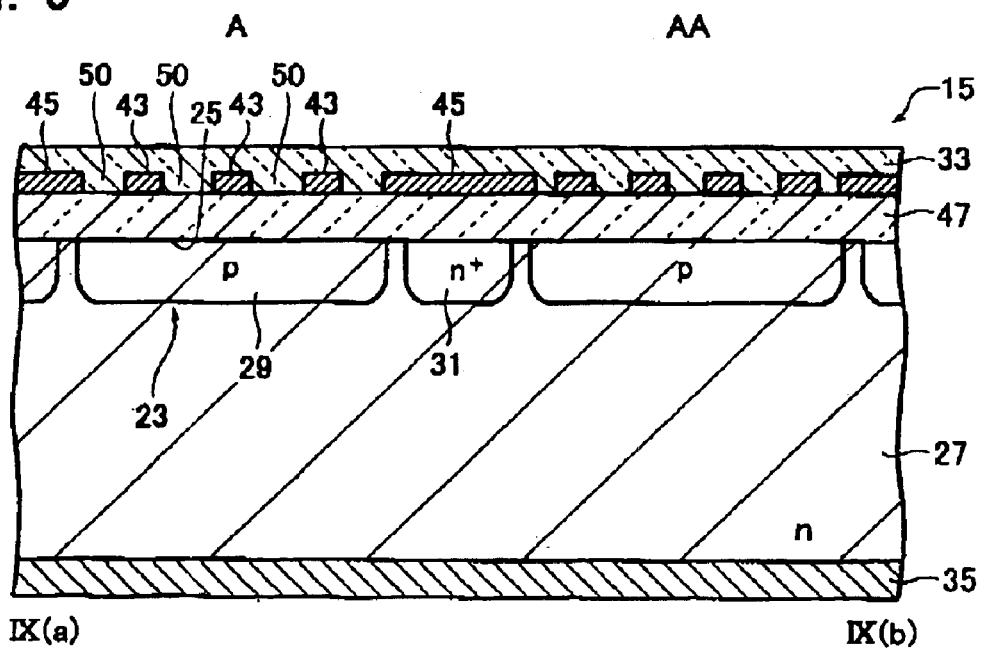
FIG. 9 is a pictorial representation of a cross-section of the optical receipt chip of FIG. 8 as taken along line IX(a)–IX(b).

FIG. 9 is a pictorial representation of a cross-section of the photosensor chip 15 of FIG. 8 as taken along line IX(a)–IX(b). Light shield portions 43 are formed at specified intervals above a p$^+$-type diffusion region 29, with a dielectric film 47 such as a silicon oxide film being sandwiched between them. An n$^+$-type diffusion region 31 has its upper surface covered with a light shield portion 45 through dielectric film 47. A protective film 33 is formed to cover the light shields 43 and 45. In this way, at each light acceptance surface 25, more than one light-passing portion or "slit" 50 of the second optical grating 41 is placed at a location corresponding to an optical signal with a phase assigned thereto; at the remaining locations, light shields 43 are positioned. The slit 50 is a region between neighboring light shields 43.

An additional advantage of the second embodiment other than the advantages similar to those of the first embodiment is as follows. According to the second embodiment, even when enlarging the area of a light acceptance surface 25 in order to lessen the junction capacitance of photodiode 23, high-precision measurement becomes possible because the second optical grating 41 is disposed at the light acceptance surface 25.

Figure 10:
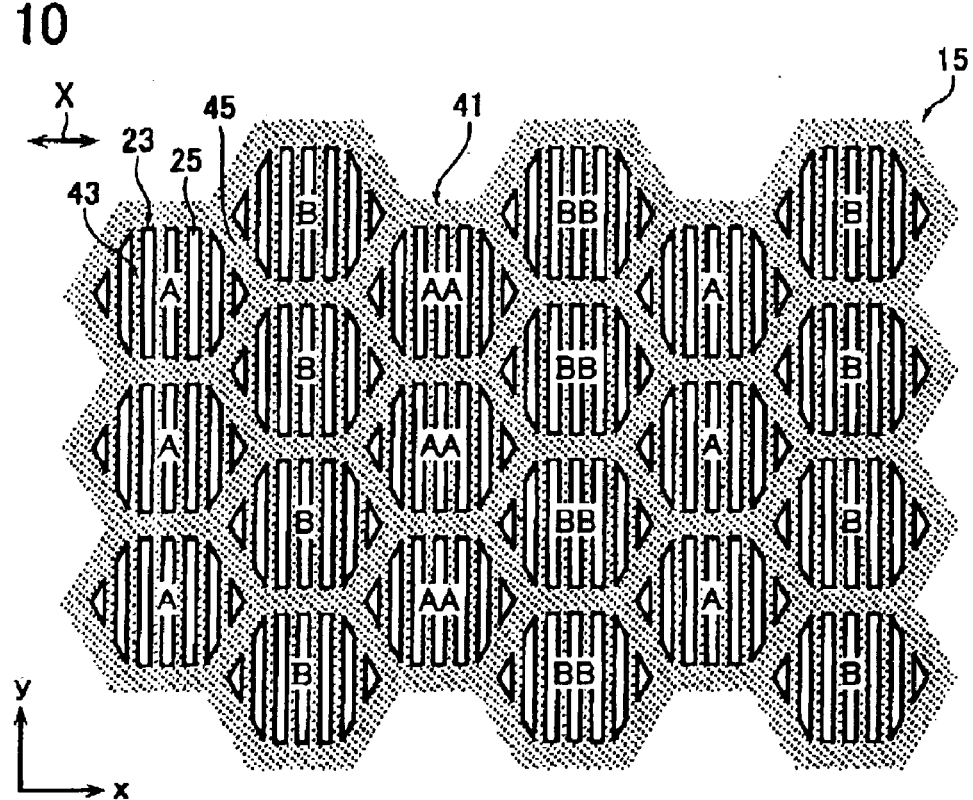
FIG. 10 is a diagram pictorially representing a plan view of part of an optical receipt chip in accordance with a first modification of the second embodiment.

Various modified examples are available for the second embodiment. FIG. 10 is a pictorial representation of a plan view of part of a photosensor chip 15 of a first modification. The first modification is arranged so that the second optical grating 41 is formed at photosensor chip 15 in such a manner as to cover each light acceptance surface 25 of the 2D layout shown in FIG. 6.

Figure 11:
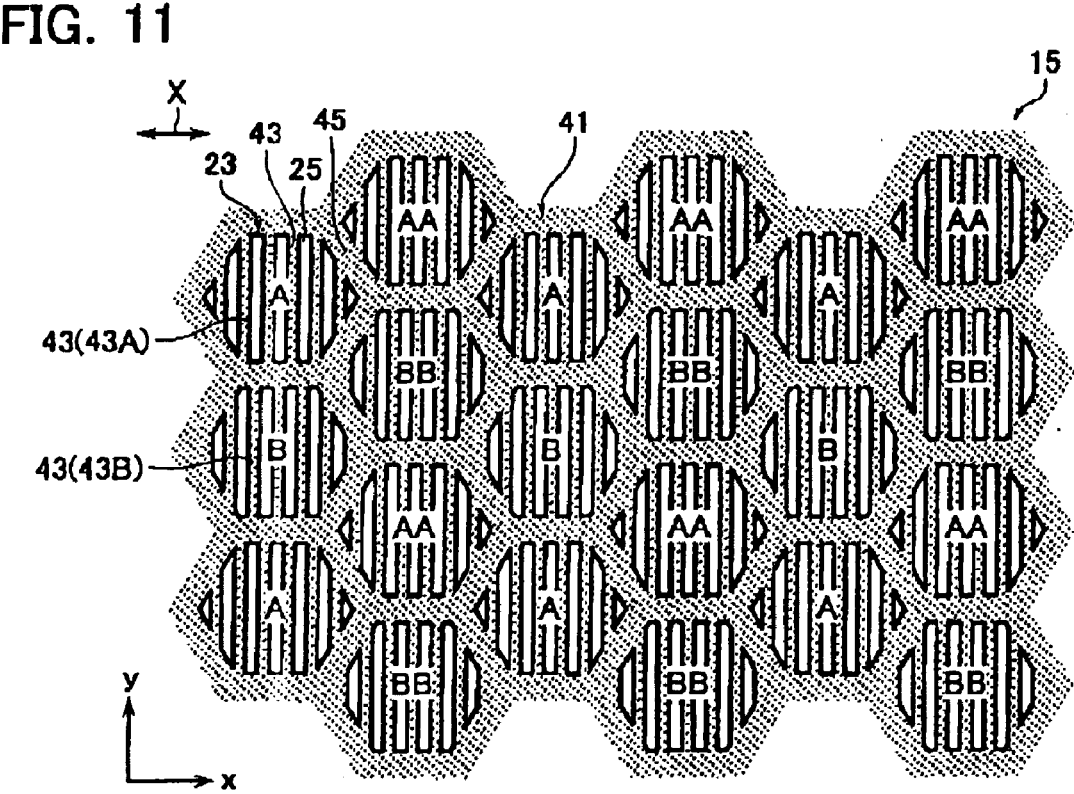
FIG. 11 is pictorial plan view of part of an optical receipt chip in accordance with a second modification of the second embodiment.

FIG. 11 is a pictorial representation of a plan view of part of a photosensor chip 15 of a second modification. A difference of it from the first modification is that columns each having an array of alternate arrangement of light acceptance surfaces 25 used for the phases A and B in the y direction and columns each having a queue of alternate layout of light acceptance surfaces 25 used for the phases AA and BB in the y direction are alternately laid out in the x direction. Additionally, light shield portions 43 are disposed with offsets in position. For example, a light shield 43A of a light acceptance surface 25 for the phase A use and a light shield 43B of an acceptance surface 25 for the phase B use are offset relative to each other. The use of this arrangement precludes unwanted incidence of optical signals with the same phase onto light acceptance surfaces 25 used for difference phases.

Figure 12:
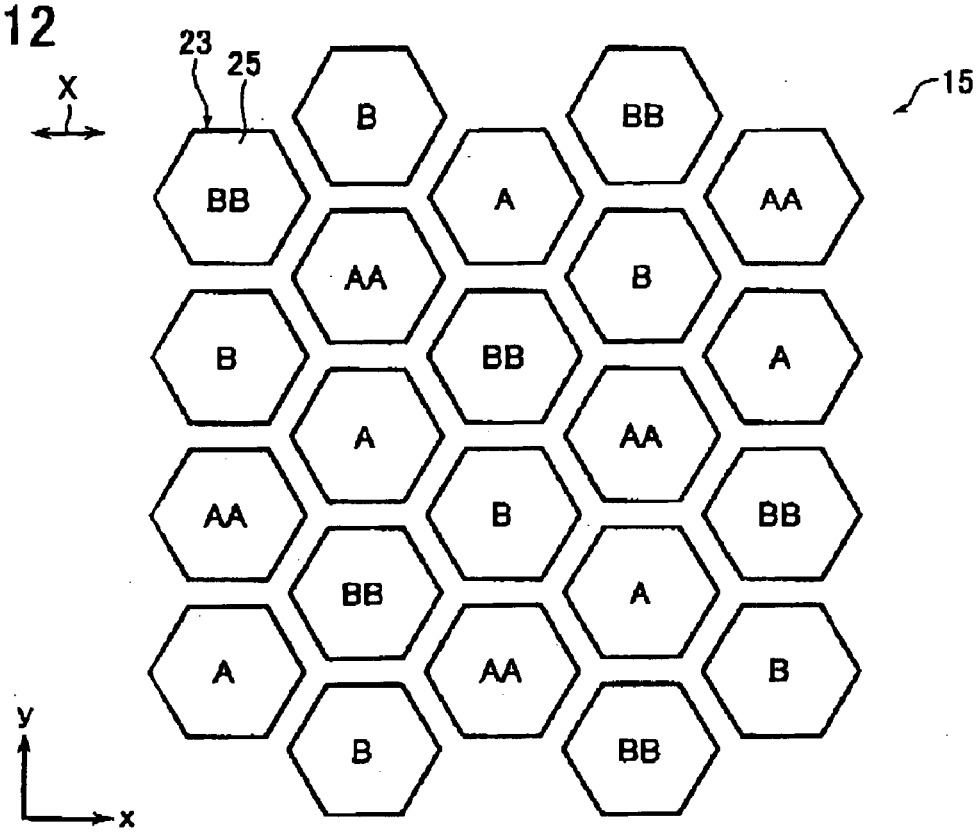
FIG. 12 is a pictorial plan view of part of an optical receipt chip of with a third modification of the second embodiment.
Figure 13:
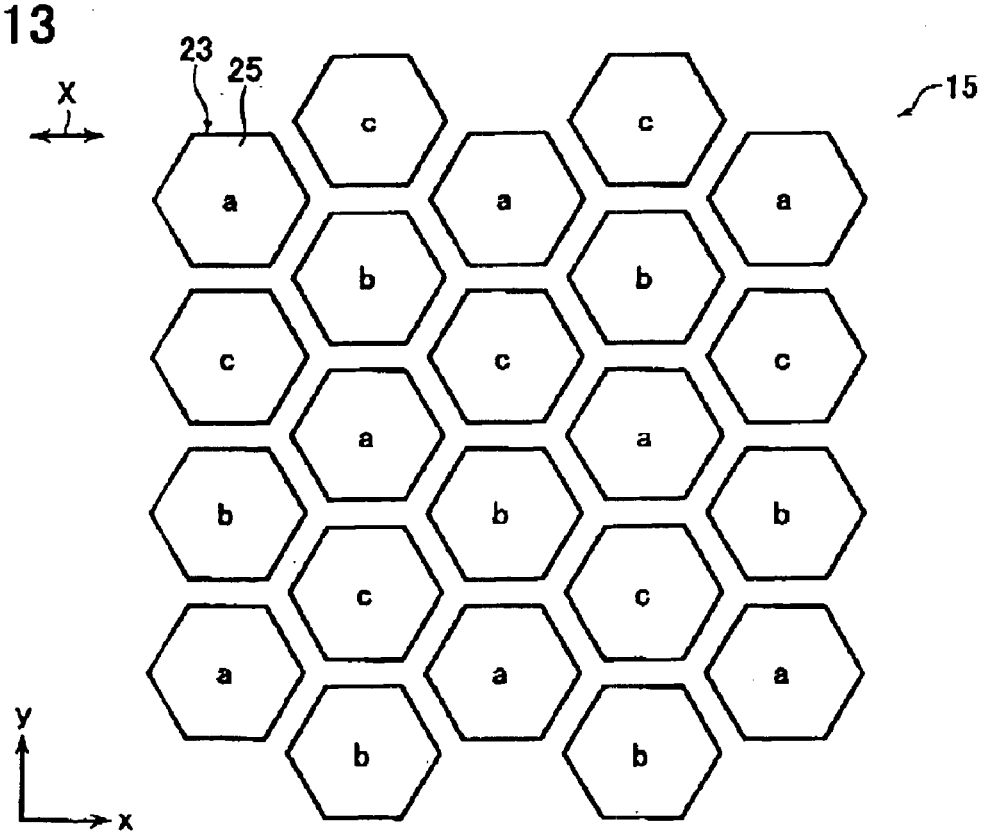
FIG. 13 is a pictorial plan view of part of an optical receipt chip of a fourth modification of the second embodiment.

FIG. 12 is a pictorial representation of a plan view of part of a photosensor chip 15 of a third modification, whereas FIG. 13 is a plan view of part of a fourth modification. Illustration of the second optical grating is omitted herein. The third modification of FIG. 12 is such that columns each having an array of light acceptance surfaces 25 used for the phases A, AA, B and BB in a sequential order in the y direction are disposed sequentially in the x direction.

A feature of the fourth modification of FIG. 13 lies in its photosensor chip which detects three phase-different optical signals, unlike the ones stated supra. In short, the three signals are an optical signal with a phase "a" (zero degrees), a light signal with a phase "b" (120 degrees) which is shifted by 120 degrees from the phase a, and a light signal with a phase "c" (240 degrees) that is offset by 240 degrees from the phase a. The fourth modification has a structure that columns each having a sequential array of light acceptance surfaces 25 used for the phases a, b and c in the y direction are disposed in the x direction.

With the 2D layout of light acceptance surfaces 25 as in the third and fourth modifications also, providing the second optical grating makes it possible to detect phase-different light signals.

[Third Embodiment]

Figure 14:
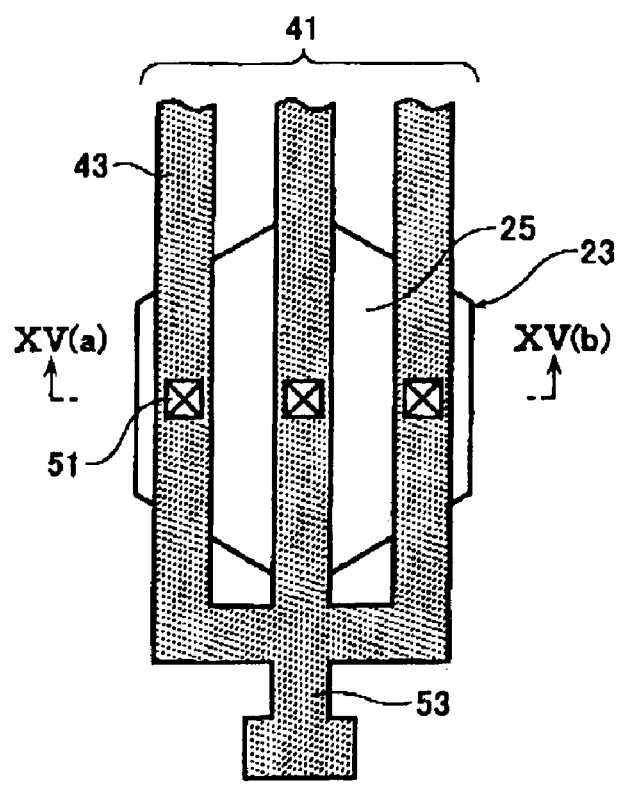
FIG. 14 is a plan view pictorially representing a layout relationship of one light acceptance surface versus a second optical grating, which is used in a photoelectric encoder in accordance with a third embodiment.
Figure 15:
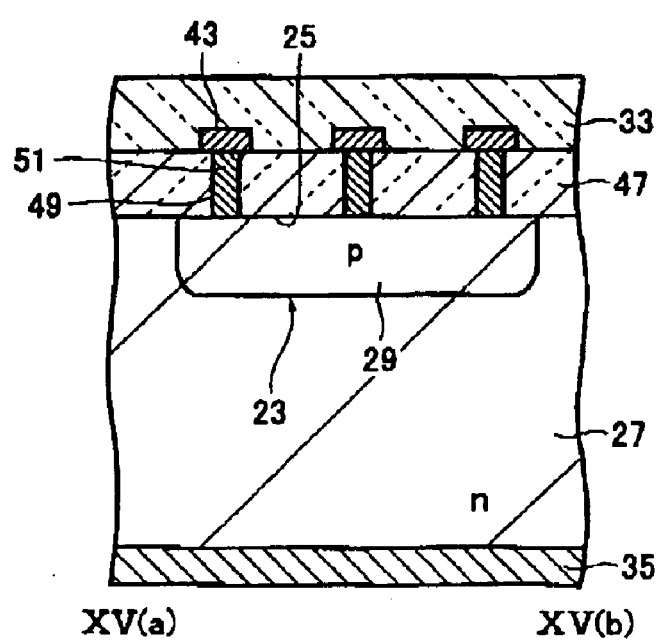
FIG. 15 is a pictorial representation of a cross-section of the structure shown in FIG. 14 as taken along line XV(a)–XV(b).

An explanation of a third embodiment will now be given while focusing it on a difference from the first and second embodiments. FIG. 14 is a pictorial partial plan view of a photoelectric encoder in accordance with the third embodiment, for showing the positional relationship between one light acceptance surface 25 used in the encoder and a second optical grating 41. FIG. 15 is a pictorial representation of a cross-sectional view of the structure shown in FIG. 14 as taken along line XV(a)–XV(b).

In the third embodiment, light shield portions 43 of the second optical grating 41 are for use as part of an electrical wiring line for connection to a photodiode 23. This will be explained in detail below. The light shields 43 are made of a metal with high conductivity, such as aluminum or else. An electrical wiring line 53 is positioned at the same layer as the light shields 43. The wiring lead 53 is connected to light shield 43. Wire 53 is the one that was fabricated simultaneously during formation of light shields 43. A dielectric film 47 is formed between the light shields 43 and light acceptance surface 25. Film 47 has contact holes 49 as formed therein. In the individual contract hole 49, a contact portion 51 is formed, which is comprised of a conductive plug (made of aluminum, for example). Contact 51 is connected to light shield 43 at a location underlying this shield 43 and is in contact with light acceptance surface 25. Accordingly, wire 53 is connected to photodiode 23 by light shield 43 and contact portion 51. Note that although in the third embodiment the contact is formed of the conductive plug, this structure is modifiable in a way which follows: when forming on the dielectric layer 47 a film for later use as light shields 43, this film is buried in contact holes 49, permitting buried film portions to act as the contacts required.

Figure 16:
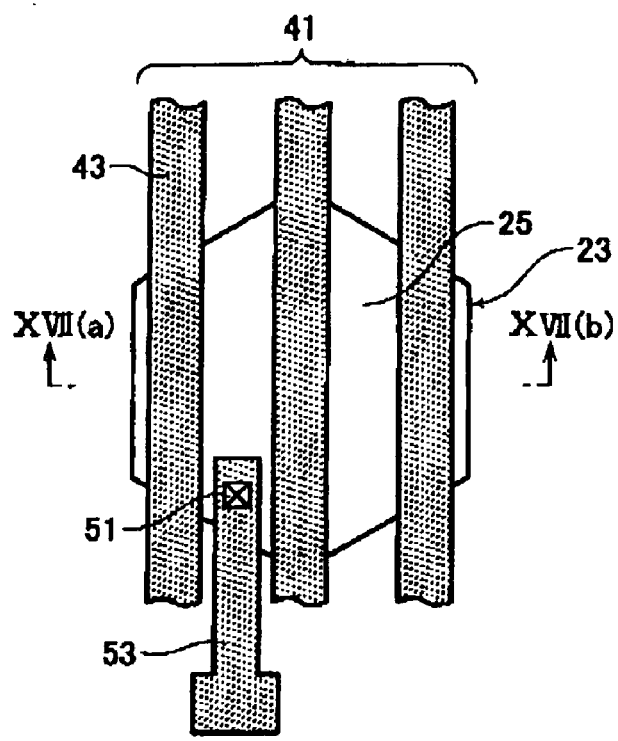
FIG. 16 is a plan view pictorially representing a layout relationship of one light acceptance surface versus a second optical grating, which is provided in the photoelectric encoder in accordance with the second embodiment.
Figure 17:
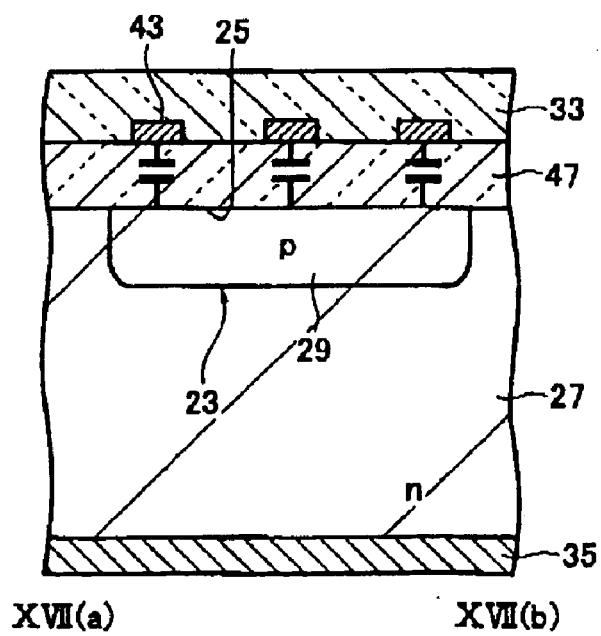
FIG. 17 is a pictorial representation of a cross-section of the structure shown in FIG. 16 taken along line XVII(a)–XVII(b).

The third embodiment has the following advantages, in addition to the similar advantages to those of the first and second embodiments, as will be explained while comparing to the second embodiment. FIG. 16 is a pictorial partial plan view of a photoelectric encoder in accordance with the second embodiment, for showing the positional relationship between a light acceptance surface 25 and a second optical grating 41 used therein. FIG. 17 pictorially represents a cross-sectional view of the structure shown in FIG. 16 as taken along line XVII(a)–XVII(b).

In the second embodiment an electrical wiring line 53 is disposed between neighboring light shied portions 43 above a light acceptance surface 25. Under this wire 53, a contact portion 51 is laid out and connected to this wire. Contact 51 is brought into contact with light acceptance surface 25. As part of wire 53 overlies acceptance surface 25, the effective photosensitive area of acceptance surface 25 is expected to decrease. On the contrary, the third embodiment is designed to utilize the light shied 43 with electrical conductivity for connection between wire 53 and PD 23. Thus it is possible to prevent or at least greatly suppress reduction of the effective photosensitive area of light acceptance surface 25.

Additionally in the second embodiment, as shown in FIG. 17, parasitic capacitance components are created between light shields 43 and p-type diffusion region 29. This badly serves to lower the response speed of encoder. In contrast, the third embodiment is free from such creation of parasitic capacitor components. This can be said because light shields 43 are connected by contacts 51 to p-type diffusion 29.

Note that as shown in FIG. 1, the photoelectric encoders 1 in accordance with the first to third embodiments are of the so-called transmission type for performing the measurement of a displacement amount by use of the light L from LED 3 after having passed through the first optical grating 11 of scale 5. However, this invention is also applicable to photoelectric encoders of the reflection type—that is, in the case where a displacement amount is measured by using the light L from LED 3, which was reflected at the first optical grating 11 of scale 5.

As apparent from the foregoing, in accordance with the photoelectric encoder embodying the invention, it becomes possible to attain both an improvement in averaging effect and a decrease in junction capacitance of light-receiving elements. The improvement in averaging effect enables achievement of high-precision measurements. On the other hand, the decrease in junction capacitance of light-receiving elements makes it possible to increase the response speed of the photoelectric encoder.

What is claimed is:

1. A photoelectric encoder comprising:
   a light source;
   a scale including a first optical grating for receiving irradiation of light from said light source; and
   a light-receiving unit including light-receiving elements each having a hexagonal light acceptance surface for permitting incidence of an optical signal as generated based on the light falling onto said first optical grating, said light-receiving unit being relatively movably disposed with a gap provided between itself and said scale for detecting a plurality of phase-different optical signals by said light-receiving elements as two-dimensionally disposed on a plane opposing said first optical grating.

2. The photoelectric encoder according to claim 1, wherein said light-receiving elements are such that neighboring ones are different from each other in phase of optical signals to be detected.

3. The photoelectric encoder according to claim 1, wherein said light-receiving elements are an optical receipt chip including second optical gratings, each of these having light shield portions disposed above each of said light acceptance surfaces.

4. The photoelectric encoder according to claim 3, wherein said optical receipt chip includes:
   contact portions underlying said light shield portions with electrical conductivity and being connected thereto while being in contact with said light acceptance surfaces; and
   electrical wiring lines of said light-receiving elements as connected to said light shield portions.

* * * * *